United States Patent [19]

Smiszek

[11] Patent Number: 4,925,224
[45] Date of Patent: May 15, 1990

[54] ENERGY ABSORBING VEHICLE BUMPER

[75] Inventor: James L. Smiszek, Romeo, Mich.

[73] Assignee: Romeo-Rim, Inc., Romeo, Mich.

[21] Appl. No.: 320,081

[22] Filed: Mar. 6, 1989

[51] Int. Cl.$^5$ .................. B60R 19/18; B60R 19/03
[52] U.S. Cl. .................................... 293/120; 293/121; 293/136; 267/140
[58] Field of Search ............... 293/120, 121, 122, 136; 267/140

[56] References Cited

U.S. PATENT DOCUMENTS

| | | | |
|---|---|---|---|
| 2,910,033 | 10/1959 | Weisburg | 293/120 X |
| 3,843,182 | 10/1974 | Walls et al. | 293/122 |
| 3,902,748 | 9/1975 | Bank et al. | 293/110 |
| 3,989,292 | 11/1976 | Bank et al. | 293/110 |
| 4,061,384 | 12/1977 | Montgomery et al. | 293/120 X |
| 4,103,951 | 8/1978 | Bank et al. | 293/110 |
| 4,428,568 | 1/1984 | McNatt et al. | 267/140 |
| 4,460,206 | 7/1984 | Peter | 293/120 X |
| 4,549,757 | 10/1985 | Minkhorst | 293/120 |

FOREIGN PATENT DOCUMENTS

| | | | |
|---|---|---|---|
| 118548 | 7/1984 | Japan | 293/121 |
| 2134858 | 8/1984 | United Kingdom | 293/120 |

Primary Examiner—Margaret A. Focarino
Assistant Examiner—Andrew C. Pike
Attorney, Agent, or Firm—Renner, Kenner, Greive, Bobak, Taylor & Weber

[57] ABSTRACT

An energy absorbing bumper (20) for a vehicle includes an elastomeric bumper module (24) having a longitudinally extending impact face (25) and upper and lower walls (26,27) extending laterally therefrom toward a rear support plate (21) which is attachable to the vehicle and which engages the upper and lower walls (26,27) of the module (24). A plurality of longitudinally spaced upper ribs (31) extend from the impact face (25) and generally laterally along the upper wall (26) toward the rear support plate (21). A plurality of similarly longitudinally spaced lower ribs (32) extend from the impact face (25) and generally laterally along the lower wall (27) toward the rear support plate (21). A longitudinal rail (34) extends from between the upper and lower ribs (31,32) on the impact face (25) toward the rear support plate (21). Upon impact against the impact face (25), the module (24) thereby absorbs the energy of the impact.

19 Claims, 4 Drawing Sheets

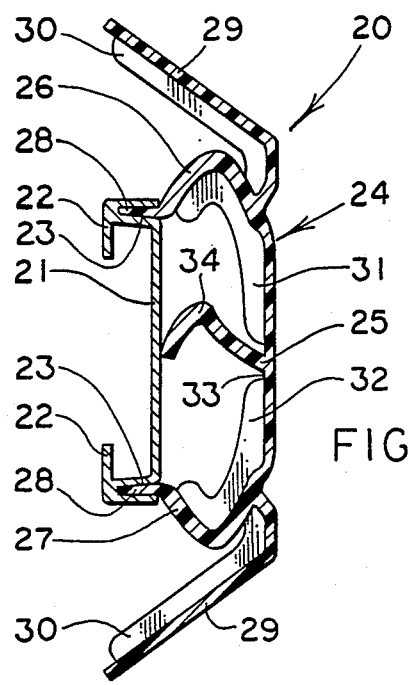
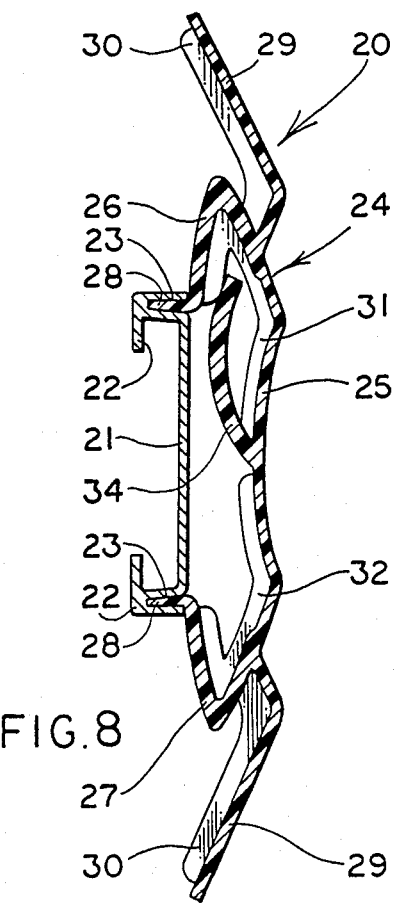

ENERGY ABSORBING VEHICLE BUMPER

TECHNICAL FIELD

This invention relates to a bumper for vehicles such as cars, buses, trucks and the like. More particularly, this invention relates to an elastomeric bumper capable of absorbing the energy of the impact of a vehicle and another object.

BACKGROUND ART

Various types of energy absorbing bumpers are known in the art. One such type is commonly known as a pneumatic or semi-pneumatic bumper wherein it is intended that air trapped within the bumper will absorb some of the energy of the impact. However, if the bumper is constructed to provide a totally enclosed chamber, the entrapped air actually acts as an energy storing medium as opposed to an energy dissipating medium, and as such, there is a tendency for the bumper to act as a spring imparting a potentially harmful rebound effect following impact.

In another type of pneumatic bumper system the air within the bumper is vented to a storage tank upon impact and then allowed to bleed back to the bumper. While representing an improvement over the totally closed system, such a bumper is limited in its capacity to absorb energy because as air is transferred to the tank and the pressure increase therein, the bumper itself resists further compression.

Non-pneumatic energy absorbing bumpers generally consist of an elastomeric shell which is affixed to the vehicle and includes a plurality of vertical reinforcing ribs therein which are designed to absorb the energy of an impact. As will hereinafter be discussed in greater detail, while effective for certain applications, the energy absorbing characteristics of such bumpers are quite limited and only if they are made unwieldily large could they be suitable for higher vehicle speed impacts.

DISCLOSURE OF THE INVENTION

It is thus a primary object of the present invention to provide a more efficient energy absorbing vehicle bumper.

It is another object of the present invention to provide a vehicle bumper, as above, which provides impact protection at higher vehicular speeds and yet is of an efficient size and weight.

It is a further object of the present invention to provide a vehicle bumper, as above, which can provide impact protection at lower vehicular speeds economically.

These and other objects of the present invention, which will become apparent in the description to follow, are accomplished by the means hereinafter described and claimed.

In general, the energy absorbing bumper includes an elastomeric module having a longitudinally extending front impact face with upper and lower walls extending generally laterally therefrom. A rear support plate, which can be attached to a vehicle, engages the upper and lower walls of the module. The module also includes a plurality of longitudinally spaced ribs which extend laterally from the impact face and along the upper wall toward the rear support plate, a plurality of similarly longitudinally spaced ribs which extend laterally from the impact face and along the lower wall toward the rear support plate; and a longitudinal rail which extends laterally from between the plurality of ribs on the impact face toward said rear support plate. The module absorbs the energy of an impact against the impact face by a distortion of the walls and ribs and by the buckling and subsequent deflection of the rail.

BRIEF DESCRIPTION OF THE DRAWINGS

FIGS. 6-8, inclusive, are somewhat schematic sectional views of the bumper according to the present invention similar to FIG. 4 and sequentially showing the deformation of the bumper upon impact.

PREFERRED EMBODIMENT FOR CARRYING OUT THE INVENTION

Figure 1:
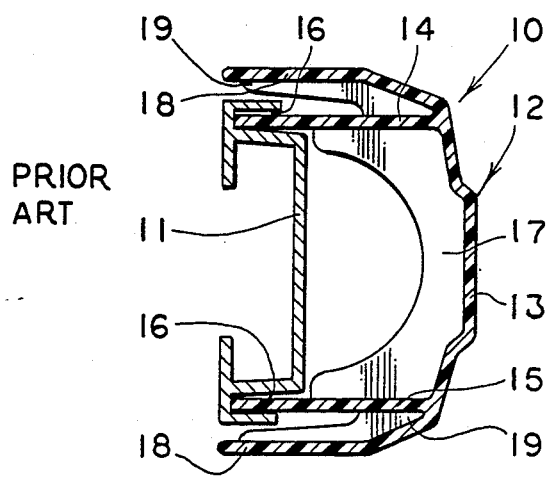
FIG. 1 is a sectional view of a typical prior art energy absorbing bumper.

In order to fully appreciate the significance of the design of the bumper of the present invention, a discussion of a prior art bumper as shown in FIG. 1 will be helpful. The prior art bumper is indicted generally by the numeral 10 and includes a metallic back plate 11 which can be mounted to the front or rear of a vehicle. Back plate 11 carries a bumper module, generally indicated by the numeral 12, which includes a front impact face 13 and upper and lower walls 14 and 15, respectively. The rear end of walls 14 and 15 are received in slots 16 of plate 11 and attached thereto. A plurality of generally C-shaped vertical ribs 17 are spaced longitudinally within module 12 and extend rearwardly from the impact face 13 and along upper and lower walls 14 and 15. Bumper 10 is also shown as having upper and lower wings 18 with reinforcing ribs 19 extending therefrom to upper and lower walls 14 and 15. These wings are primarily for aesthetic purposes and generally play no role in the energy absorbing characteristics of the system.

The energy absorbed by prior art bumper 10, or any energy absorbing bumper for that matter, is intended to be equal to the kinetic energy of the vehicle, that is, the total energy absorbed is to equal the work performed in stopping the vehicle. This work equals the force between the bumper and an object multiplied by the distance of deflection of the bumper encountered to reduce the velocity of the vehicle to zero.

The results of tests performed on prior art bumper 10 are shown in Table I.

TABLE I

| Velocity (MPH) | Module Deflection (Inches) | Force On Impact (Pounds) |
|---|---|---|
| 0.5 | 0.72 | 400 |
| 1.0 | 1.10 | 850 |
| 1.5 | 1.38 | 1400 |
| 2.0 | 1.62 | 2200 |
| 2.5 | 1.84 | 3400 |
| 3.0 | 2.06 | 4900 |

TABLE I-continued

| Velocity (MPH) | Module Deflection (Inches) | Force On Impact (Pounds) |
| --- | --- | --- |
| 3.5 | 2.30 | 7600 |
| 4.0 | 2.47 | 10800 |
| 4.5 | 2.70 | 15000 |
| 5.0 | 2.96 | 18500 |

Table I shows that a vehicle equipped with prior art bumper 10 was impacted against an object at one-half mile per hour increments between one-half and five miles per hour. The deflection of the module and the force of the impact were measured. Since it has been found that forces of approximately 20,000 pounds will do damage to the vehicle, Table I reflects that an approximate five mile per hour impact is the maximum sustainable by prior art bumper 10.

Figure 2:
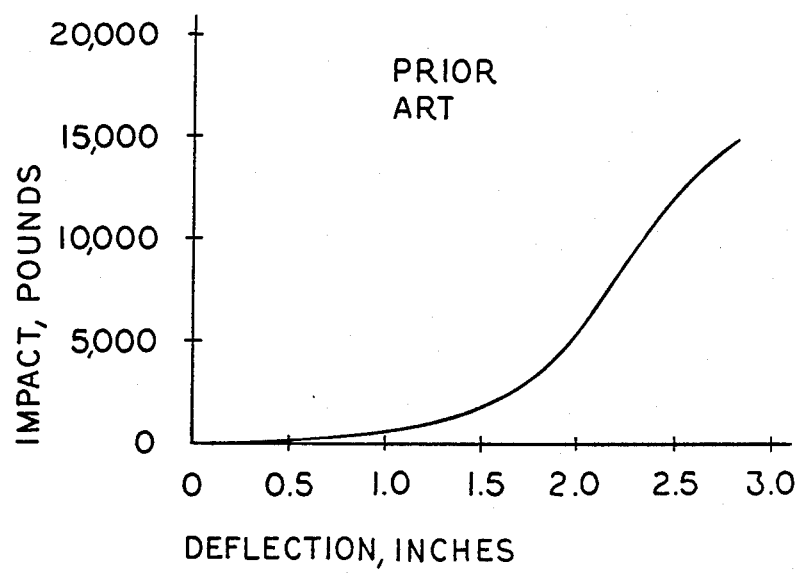
FIG. 2 is a curve plotting the impact force in pounds versus the deflection of the bumper in inches for tests conducted on the prior art bumper of FIG. 1.

A plot of the data in Table I, that is, force in pounds versus deflection in inches, is shown in FIG. 2. The area under the resulting curve equals the work performed or energy absorbed by the prior art bumper. In order to do more work, that is, absorb more energy, the ideal curve would consist of higher forces at smaller deflections followed by rather uniform forces at larger deflections so as to maximize the area under the curve, that is, the work. As will be demonstrated hereinafter, the bumper according to the concept of the present invention absorbs energy approaching that ideal situation.

Figure 3:
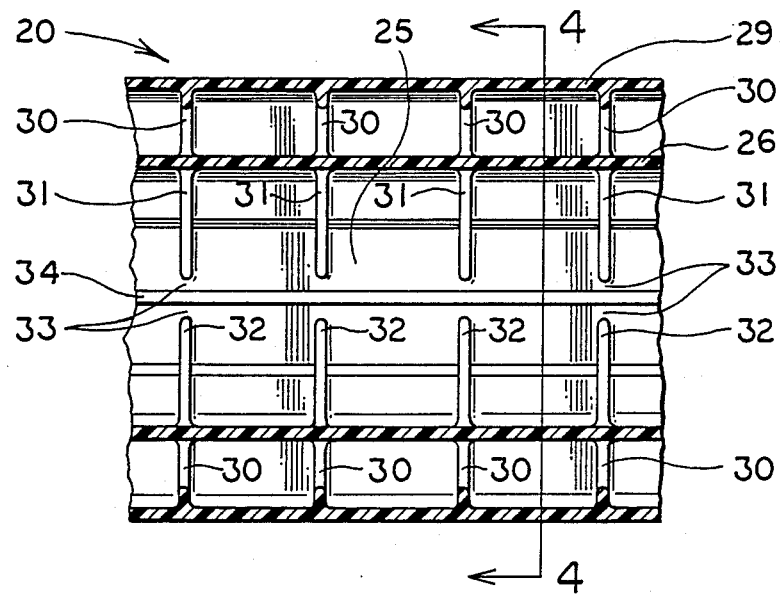
FIG. 3 is a fragmented sectional view taken substantially along line 3—3 of FIG. 4 showing the rear of a bumper module according to the present invention.
Figure 4:
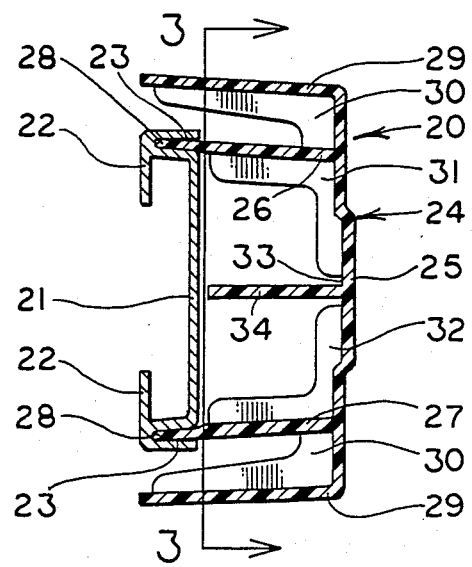
FIG. 4 is a sectional view taken substantially along line 4—4 of FIG. 3.

The configuration of the bumper assembly according to the present invention is best shown in FIGS. 3 and 4, and is indicated generally by the numeral 20 therein. Bumper assembly 20 includes a longitudinally extending rear support plate 21 having inwardly directed flanges 22 thereon for mounting plate 21 to the front or rear of a vehicle by any suitable means such as bolts or the like. Plate 21 is also provided with upper and lower slots 23 which, as will hereinafter be described, engage a bumper module generally indicated by the numeral 24. Plate 21 is preferably constructed of aluminum but can be of most any metallic material.

Bumper module 24 includes a generally vertical impact face 25 opposite support plate 21 with an upper wall 26 and lower wall 27 extending generally laterally therefrom toward support plate 21. The ends of walls 26 and 27 are provided with a bead area 28 of reduced thickness which fits within and is engaged by slots 23 of plate 21 and retained therein by a plurality of any suitable fastening devices, such as self-tapping screws or the like. Module 24 is also shown as having upper and lower wings 29 with reinforcing ribs 30 extending therefrom to walls 26 and 27. Wings 29 are generally provided for aesthetic purposes and play no appreciable role in the energy absorbing characteristics of the bumper.

A plurality of upper ribs 31 are longitudinally spaced along module 24 and extend laterally inward from impact face 25 and along upper wall 26 toward support plate 21 terminating just short thereof. Ribs are shown as being vertically oriented but bumper 20 would operate effectively if they were oriented differently, for example, at an angle. A plurality of lower ribs 32 are similarly longitudinally spaced along module 24, that is, they are longitudinally aligned with ribs 31. Lower ribs 32 extend laterally inward from impact face 25 and along lower wall 27 toward support plate 21 terminating just short thereof. Ribs 32, like ribs 31, are shown to be vertically oriented but could likewise be at an angle without significantly detracting from the efficiency of bumper 20.

Both upper ribs 31 and lower ribs 32 are shown as terminating just short of the center of impact face 25 leaving a small space 33 therebetween at the center of impact face 25. A generally horizontal rail 34 is positioned longitudinally along impact face 25 and extends laterally rearwardly from space 33 toward support plate 31, terminating just short thereof.

Figure 6:
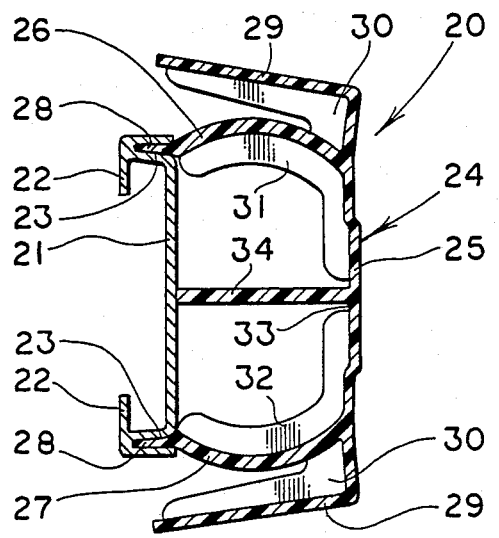

The manner in which bumper 20 acts to absorb the energy of impact upon face 25 is best shown with reference to FIGS. 6–8, inclusive, which depict the sequential deformation of the bumper upon impact. FIG. 6 shows the module 24 just after impact with the horizontal rail 34 just beginning to engage rear plate 21. At this point basically only upper and lower ribs 31 and 32 along with walls 26 and 27 have acted to absorb the force and, as shown in FIG. 6, they begin to distort or generally balloon outwardly. The gap between the end of the horizontal rail 34 and rear plate 21 is preferably originally in the range of one-half inch to one and one-half inches and thus FIG. 6 would represent bumper deflection in that range.

At this point in time the horizontal rail 34 takes over, that is, substantially assists upper and lower ribs 31 and 32 and walls 26 and 27 in absorbing the impact. Thus, as shown in FIG. 7, rail 34 begins to buckle as ribs 31 and 32 as well as walls 26 and 27 further distend. Here the space 33 assumes operative significance in that it affords rail 34 with a freedom to fold. If rail 34 were too rigidly confined, undesirable forces would be generated.

FIG. 8 depicts module 24 at its fullest deformation. As shown, ribs 31 and 32 as well as walls 26 and 27 are fully distended and the forces on rail 34 have caused it to deflect over into this distended area. Because it is important that rail 34 be able to freely deflect to the FIG. 8 position, the height of the module should be sufficient to accommodate the deflected rail without restriction. Thus, in general, the height of the module, that is, the height of impact face 25, should be about twice the depth of rail 34 to assure full space for the rail when the module is in the fully deformed FIG. 8 position.

Figure 5:
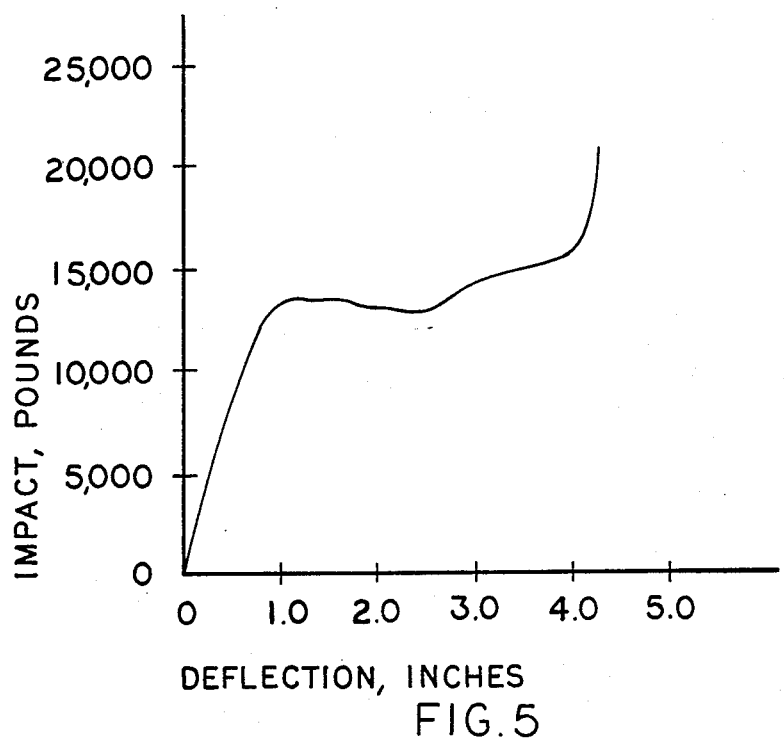
FIG. 5 is a curve plotting the impact force in pounds versus the deflection of the bumper in inches for tests conducted on the bumper according to the present invention shown in FIGS. 3 and 4.

The vastly improved efficiency of bumper 20 versus the prior art bumper 10 is best shown by the graph of FIG. 5 which is based on tests performed on bumper 20, the results of which are shown in the following Table II.

TABLE II

| Velocity (MPH) | Module Deflection (Inches) | Force on Impact (Pounds) |
| --- | --- | --- |
| 3.5 | 1.16 | 13520 |
| 4.0 | 1.36 | 13260 |
| 4.5 | 1.68 | 13520 |
| 5.0 | 1.94 | 13260 |
| 5.5 | 2.30 | 13000 |
| 6.0 | 2.72 | 13000 |
| 6.5 | 3.14 | 13780 |
| 7.0 | 3.68 | 14820 |
| 7.5 | 4.30 | 16900 |
| 8.0 | 4.38 | 20280 |

Table II shows that a vehicle equipped with bumper 20 was impacted against an object at one-half mile per hour increments between three and one-half and eight miles per hour. The deflection of the module and the force of impact were measured.

The resulting plot, FIG. 5, readily demonstrates that bumper 20 performs more work, that is, absorbs more energy, than the prior art bumper. In fact, the curve of FIG. 5 approaches the ideal curve with higher forces at smaller deflections followed by rather uniform forces at larger deflections thereby maximizing the area under the curve, that is, the work.

Moreover, other comparisons of Table I versus Table II and FIG. 2 versus FIG. 5 demonstrate the improved nature of bumper 20. In the prior art the upper acceptable force limit, that is, 20,000 pounds, was approached at a five mile per hour impact whereas bumper 20 can withstand impacts of almost eight miles per hour without exceeding that limit. Also, there is an approximate maximum two mile per hour improvement in the bumper efficiency when comparing the inches of stroke at the three and one-half mile per hour reading in Table I and the five and one-half mile per hour reading in Table II. In other words, for the same stroke, bumper 20 can withstand impact of two miles per hour higher. Thus, a smaller more efficient bumper can be designed according to the teachings herein and still withstand the same impact as the prior art bumpers.

While the exact nature of the material of bumper 20 is not critical to the present invention, it is important that module 24 with its walls 26 and 27, ribs 31 and 32, and rail 34, be of an elastomeric material, preferably polyurethane. Although the specific properties of a polyurethane selected may vary depending on the application for which and the environment in which bumper 20 may be used, a polyurethane with outstanding elongation and impact properties which permit significant deformation without damage is desirable. Typical properties for such a polyurethane include a tensile strength of approximately 3100 psi, elongation at break of 380%, tear strength of 600 psi, shore D hardness of 40, and a flexural modulus of 15,000 psi at 72° F.

The precise dimensions of the various components of bumper 20 are not entirely critical with the overall size, for example, varying dependent on the specific application. Of course, as demonstrated hereinabove, bumper 20 can be made smaller, and therefore with less weight and cost, than the prior art bumper and absorb an impact of equal speed.

The bumper 20 upon which the tests shown in Table II and FIG. 5 were conducted could be considered representative of typical dimensions for bumper 20. This bumper included a module 24 which had an impact face 25 approximately 10 inches in height and a depth, that is, the distance from the impact face to rear plate 21, of approximately six inches. The upper and lower walls 26 and 27 were one-half inch thick as was the center rail 34, which was approximately five and one-quarter inches in depth. Ribs 31 and 32 were one-quarter inch in thickness and were spaced longitudinally along the module as eight and one-half inch centers. The space 33 between ribs 31 and 32 was approximately one inch to afford the one-half inch thick rail 34 sufficient space to freely deflect as previously described.

While all of these dimensions may be considered to be ideal, it should be appreciated that they could vary somewhat without departing from the spirit of this invention. It has been found, however, that if rail 34 is made substantially thicker than its preferred one-half inch, the impact forces generated become too high, and if made substantially thinner, insufficient energy is absorbed and module stroke becomes inadequate. However, the thickness of rail 34 can vary somewhat dependent on the particular application for the bumper, that is, dependent, for example, on the weight of the vehicle, its speed capability, and the like.

While the above describes the preferred embodiment of the present invention, the teachings are not to be so restricted. Alternative embodiments, which utilize the teachings herein set forth, are intended to be within the scope and spirit of the present invention. Moreover, from the foregoing it should be evident that a bumper constructed according to the concepts of the present invention will substantially improve the energy absorbing bumper art and otherwise accomplish the objects of the present invention.

What is claimed:

1. An energy absorbing bumper for a vehicle comprising an elastomeric module having a longitudinally extending front impact face and upper and lower walls extending generally laterally from said impact face; a rear support plate attachable to the vehicle and engaging said upper and lower walls; said module also including a plurality of longitudinally spaced first ribs integral with and extending generally laterally from said impact face and along said upper wall toward said rear support plate, a plurality of similarly longitudinally spaced second ribs integral with and extending generally laterally from said impact face and along said lower wall toward said rear support plate; and a flexible longitudinal rail integral with and extending generally laterally from said impact face between said plurality of first and second ribs and toward said rear support plate, said rail being free of direct connection to said plurality of first and second ribs so that said rail can freely deflect relative to said plurality of first and second ribs, said module absorbing the energy of an impact against said impact face by the distortion of said walls and ribs and the buckling and subsequent deflection of said rail.

2. An energy absorbing bumper according to claim 1, further comprising a space between said first and second ribs along said impact face, said rail extending from said space on said impact face to provide said rail with additional freedom to buckle during impact.

3. An energy absorbing bumper according to claim 1 wherein said rail has an end terminating laterally short of said rear support plate to form a space between said end of said rail and said support plate.

4. An energy absorbing bumper according to claim 3 wherein said space between said end of said rail and said rear support plate is approximately one-half inch to one and one-half inches.

5. An energy absorbing bumper according to claim 3 wherein a depth of said rail is approximately one-half a height of said impact face.

6. An energy absorbing bumper according to claim 1 wherein said first ribs terminate laterally short of said rear support plate along said upper wall and said second ribs terminate laterally short of said rear support plate along said lower wall.

7. An energy absorbing bumper according to claim 1 wherein said first and second ribs are generally vertically oriented along said impact face.

8. An energy absorbing bumper according to claim 7 wherein said first ribs are longitudinally aligned with said second ribs.

9. An energy absorbing bumper according to claim 1 wherein said module is constructed of a polyurethane material.

10. An energy absorbing bumper according to claim 1 wherein a depth of said rail is approximately one-half a height of said impact face.

11. An energy absorbing bumper according to claim 10, further comprising a space of approximately one inch between said first and second ribs along said impact face.

12. An energy absorbing bumper according to claim 11, wherein said rail is approximately one-half inch thick and extends from said space on said impact face laterally toward said rear support plate.

13. An energy absorbing bumper according to claim 12 wherein said upper and lower walls are approximately one-half inch thick.

14. An energy absorbing bumper according to claim 13 wherein said first and second ribs are approximately one-quarter inch thick.

15. An energy absorbing bumper module, for attachment to a rear support plate which is attachable to a vehicle, comprising a longitudinally extending front impact face; upper and lower walls extending generally laterally from said impact face toward the rear support plate, an end of each said walls being attachable to said rear support plate; a plurality of longitudinally spaced rib means integral with and extending generally laterally from said impact face along said upper and lower walls toward said rear support plate; and rail means integral with and extending generally laterally from said impact face toward said rear support plate and generally crosswise relative to said rib means, said rail means being free of direct connection to said rib means so that said rail means can freely deflect relative to said rib means thereby absorbing energy of an impact against said impact face.

16. An absorbing bumper module according to claim 15 wherein said rib means include first ribs extending from said impact face and along said upper wall and second ribs, spaced from said first ribs, and extending from said impact face and along said lower wall.

17. An energy absorbing bumper module according to claim 16 wherein said rail means is spaced from and between said first and second ribs.

18. An energy absorbing bumper module according to claim 17 wherein said first and second ribs are generally L-shaped having one branch extending along said upper and lower wall, respectively, and another branch extending along said impact face toward said rail means.

19. An energy absorbing bumper module according to claim 18 wherein said rail means extends from said impact face beyond said other branches of said first and second ribs.

* * * * *